UNITED STATES PATENT OFFICE.

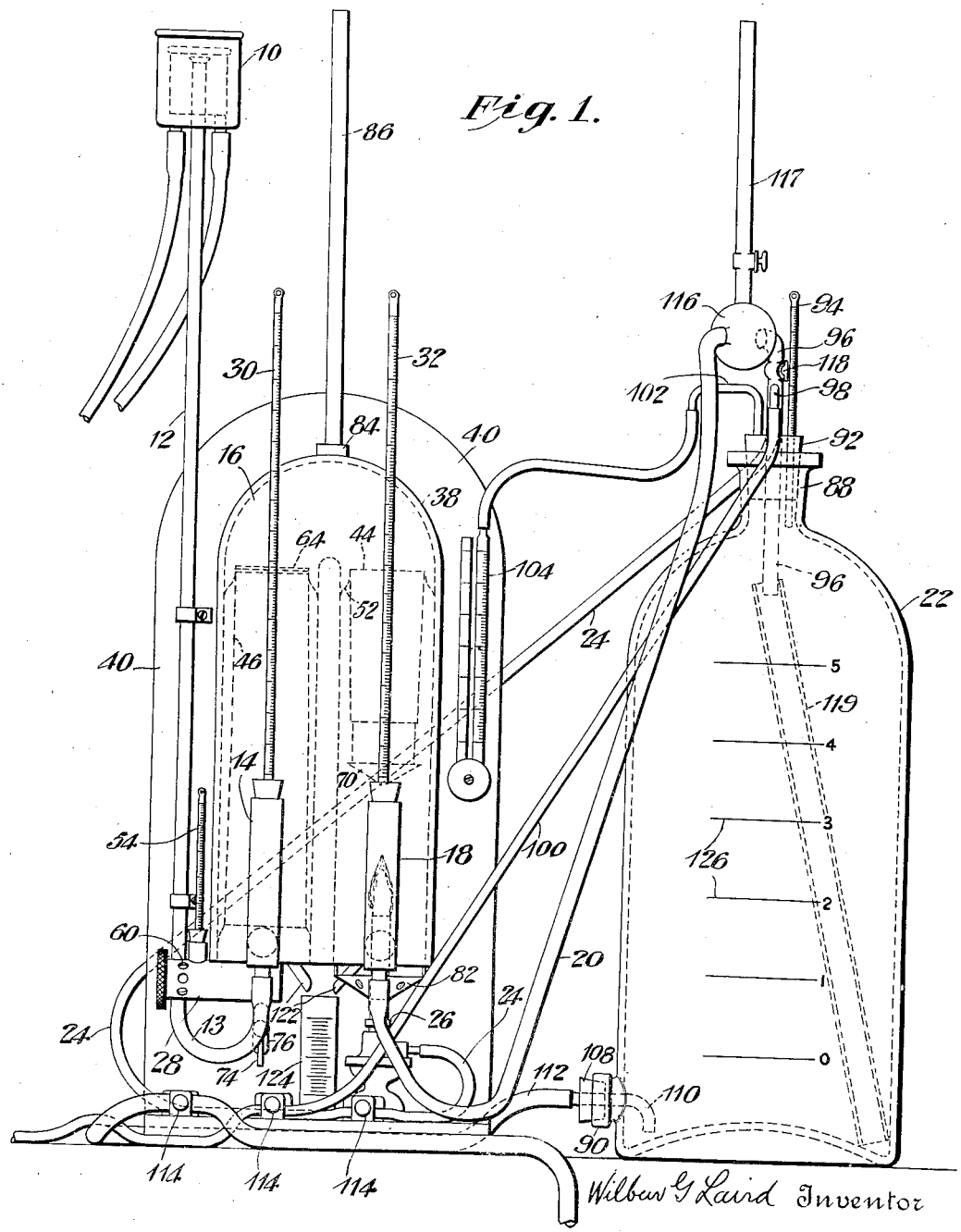

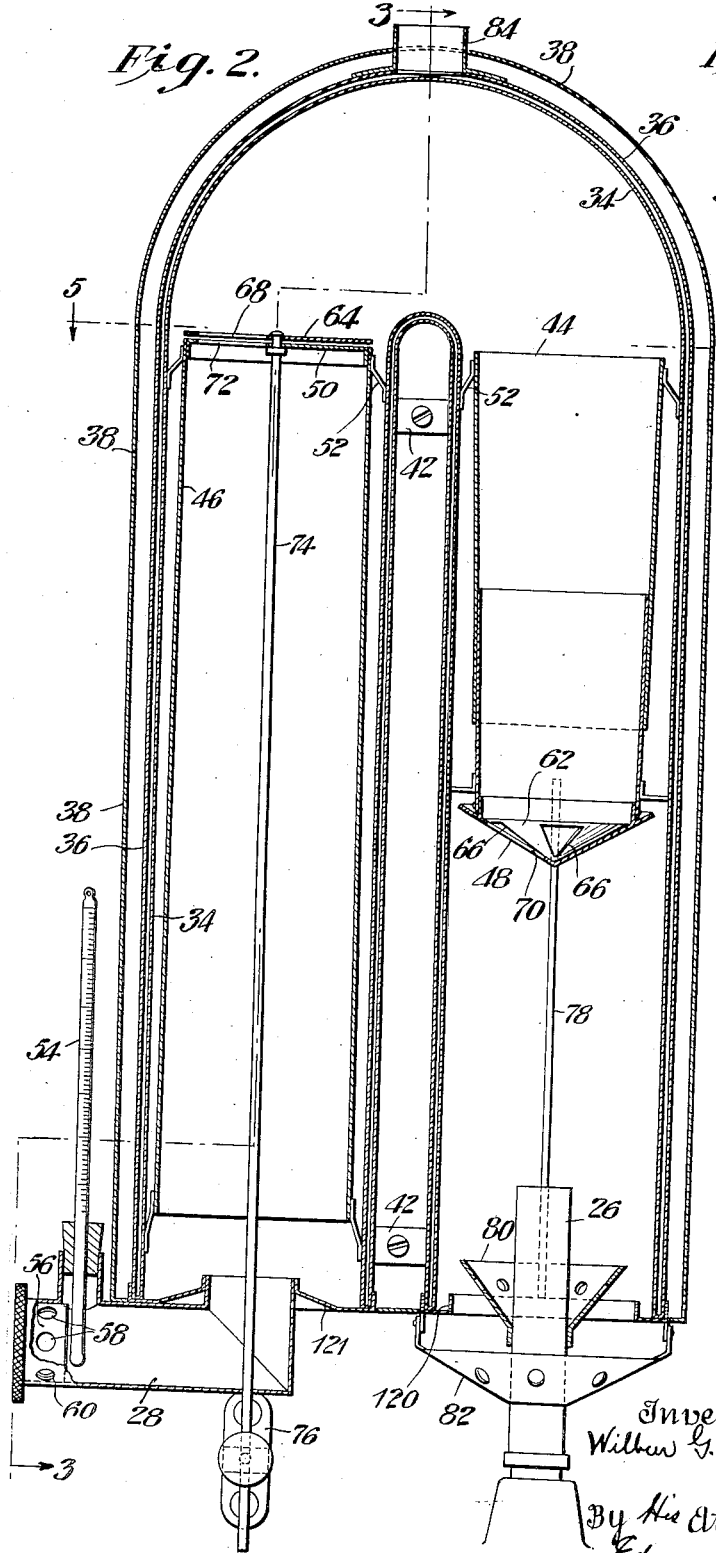
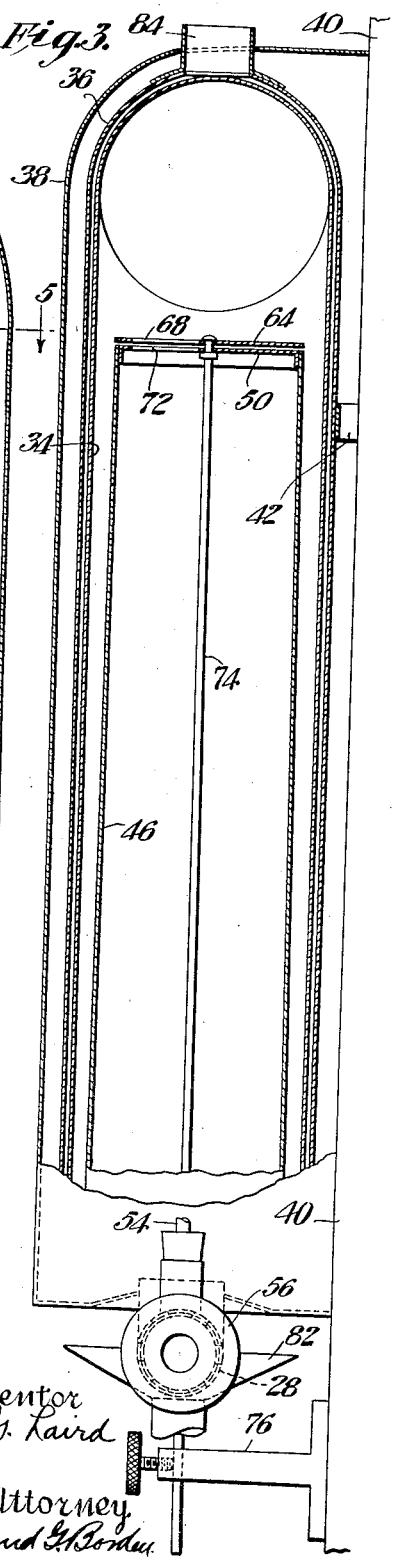

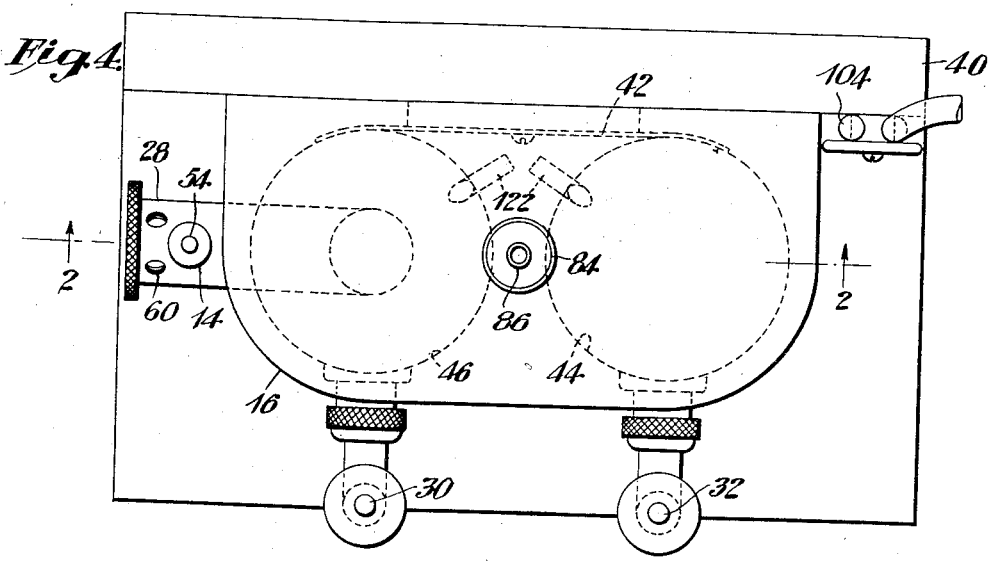
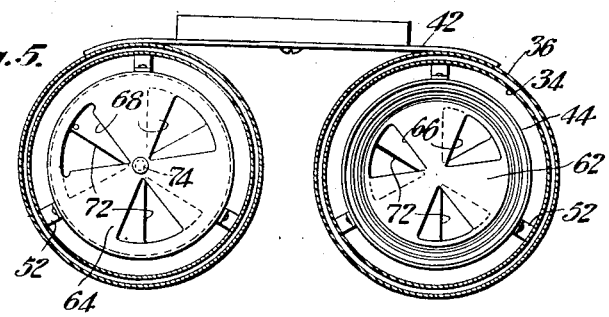
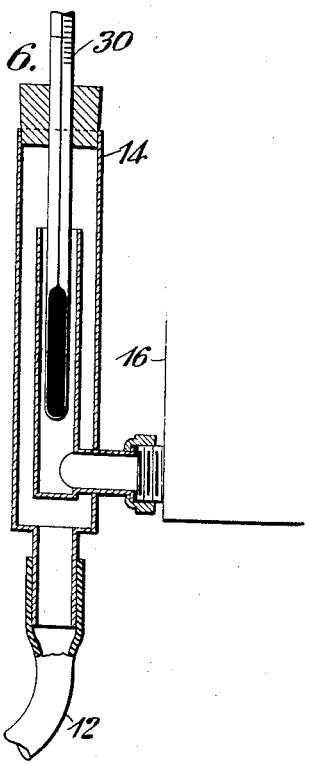
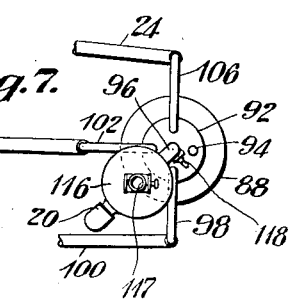

WILBUR G. LAIRD, OF NEW YORK, N. Y., ASSIGNOR TO HENRY L. DOHERTY, OF NEW YORK, N. Y.

GAS-CALORIMETER.

1,354,568.   Specification of Letters Patent.   Patented Oct. 5, 1920.

Application filed December 20, 1918. Serial No. 267,569.

*To all whom it may concern:*

Be it known that I, WILBUR G. LAIRD, a citizen of the United States, residing at New York city, in the county of New York, State of New York, have invented certain new and useful Improvements in Gas-Calorimeters; and I do hereby declare the following to be a full, clear, and exact description of the invention, such as will enable others skilled in the art to which it appertains to make and use the same.

This invention relates to calorimeters and more particularly to calorimeters for measuring the caloric values of combustible gases.

The usual method of measuring the calorific value of a gas consists in burning a measured quantity of gas, absorbing the heat of combustion of the gas in a measured quantity of water, and measuring the rise in temperature of the water due to the heat absorption. Most of the different kinds of gas calorimeters at present in use employ an absorption chamber which consists of a combustion chamber and gas flues surrounded by a body of water in which the heat generated by burning gas is absorbed. These absorption chambers, while satisfactory in many respects, have inherent defects of mechanical construction which produce errors in making heat measurements and limit accurate measurements to a narrow range of conditions. For example, it is necessary to burn a large volume of gas and heat a large quantity of water when making a heat determination in order to minimize the measurement errors. Further, since it is necessary to have a substantially perfect heat absorption, the heat absorption chamber must have a large cooling surface and contain a large volume of cooling water. An absorption chamber which will meet these conditions must be constructed of a large body of metal that will necessarily have a high thermal capacity. The high thermal capacity of the absorption chamber causes a substantial lag in the thermometer readings and a large volume of water in the absorption chamber means that a long period of time elapses between the time when water passes the inlet thermometer and when the same water passes the outlet thermometer. With such a construction, also, substantial changes in the temperature of the water entering the absorption chamber and substantial changes in the calorific power of the gas are not accurately and quickly indicated in the calorific measurements. In fact, most of the calorimeters in use are so operated that temperature measurements of the same unit of water cannot be made at the inlet and outlet of the absorption chamber during a heat determination.

The primary object of the present invention is to provide an absorption chamber for a gas calorimeter which is efficient and accurate in operation and which will overcome the objectionable features above referred to.

Another feature of the invention is to provide a gas calorimeter with a detachable gas-displacing and measuring tank which is effectively adaptable for the many different conditions in which a gas calorimeter may be used.

With these and other objects in view, the invention consists in the improved gas calorimeter hereinafter described and particularly defined in the claims.

The various features of the invention are illustrated in the accompanying drawings, in which Figure 1 is a view in front elevation of a gas calorimeter embodying the preferred form of the invention;

Fig. 2 is a view in vertical section of the heat-absorption chamber of the improved calorimeter taken on the line 2—2 of Fig. 4;

Fig. 3 is a view in vertical section of the gas-outlet leg of the absorption chamber taken on the line 3—3 of Fig. 2;

Fig. 4 is a plan view of the absorption chamber showing its mounting on the calorimeter frame and the heat-insulating jacket for covering the absorption chamber;

Fig. 5 is a horizontal section of the absorption chamber taken on the line 5—5 of Fig. 2, illustrating the combustion gas baffles and the shutters in said baffles for regulating the flow of combustion gases through the absorption chamber.

Fig. 6 is a detail view in vertical section showing the thermometer well used at the water inlet and outlet of the absorption chamber; and Fig. 7 is a plan view showing the gas and water connections of the rubber stopper for the gas-displacing tank.

The method used in the present invention for determining the calorific value of combustible gases is substantially the same as that illustrated and described in the patent to Henry L. Doherty, No. 826,306, granted August 14, 1906. The basis of this method consists in burning gas with air in an absorption chamber while displacing the gas being burned volume for volume with water being heated in the absorption chamber. With this constant ratio between the gas burned and the volume of water heated, it is only necessary to make a measurement of the difference in temperature of the water at the inlet and outlet of the absorption chamber. This temperature difference, when multiplied by the coefficient of thermal capacity of a unit quantity of water, will give the calorific value of the gas. This value must be corrected to the usual standard conditions of pressure and temperature.

To make a heat determination with the calorimeter illustrated in the drawings, the water for the determination is led in through the usual pressure regulator 10 (Fig. 1), flows through a pipe 12 into an inlet thermometer well 14, and then through a heat-absorption chamber 16. The pipe 12 is connected with the well 14 by a flexible tube 13 which will permit the pipe to be adjusted vertically to vary the water pressure. The water from the absorption chamber then passes out through a thermometer outlet well 18 through a flexible tube 20 and flows into a gas-displacing tank 22. The gas used for making the heat determination has been previously collected in the displacing tank 22 and as the water enters the displacing tank it forces the gas out of the tank through a tube 24 into a Bunsen burner 26 which is positioned under the combustion leg of the heat absorption chamber 16. The gas is burned in the burner 26 and the products of combustion pass through the combustion chamber and leave the absorption chamber through a gas outlet 28 at substantially the temperature of the room in which the heat determination is being made. A water inlet thermometer 30 is placed in the well 14 and a water outlet thermometer 32 is placed in the well 18. No record is made of the amount of gas being burned, but when the gas has burned for a sufficient period of time for the readings of the thermometers 30 and 32 to become practically constant, a reading of the thermometers may be made and this will complete the heat determination of the gas in the tank 22.

The heat absorption chamber is shown more particularly in Figs. 2, 3, 4 and 5. This absorption chamber consists in an inverted U-shaped hollow tube 34 which is surrounded by a water jacket 36. The wall of the water jacket 36 is spaced closely to the wall of the tube 34 to provide a very thin sheet of water in which the heat of the products of combustion of the gas may be readily absorbed. It will be noted that the jacket 36 will contain a very small volume of water and thus a comparatively small amount of metal will be required in the construction of the heat-absorption chamber to insure a low thermal capacity. The inlet thermometer well 14 is connected to the water jacket 36 at the lower end of the combustion gas outlet leg of the absorption chamber, and the outlet thermometer well 18 is connected to the water jacket 36 at the lower end of the combustion leg of the absorption chamber so that the water flows countercurrent to the direction of flow of the gases of combustion. To prevent radiation of heat to and from the water jacket 36, a metal cover or jacket 38 is placed over the absorption chamber and attached to a frame 40 in a position to leave an air space between the water jacket and the cover. The absorption chamber is mounted upon the frame 40 by means of brackets 42 (Figs. 2 and 4) which are arranged to maintain an air space between the rear face of the absorption chamber and the wall of the support.

Due to the method used for making heat determinations in the calorimeter, it is not necessary to burn a large amount of gas and heat a large quantity of water in order to make an accurate determination. Therefore, the volume of water used in the water jacket is held to a minimum and the amount of heat-transferring surface in the U-tube 34 is made a minimum in order to provide a heat-absorption chamber with a low thermal capacity. The transfer of heat between the combustion gases and water is very difficult because the combustion gases and water are both poor conductors of heat. Therefore, the transfer of heat between the combustion gas and water in the absorption chamber is practically all made by means of the metal surface of the U-tube. The area and length of the tube 34 is proportioned to provide sufficient heat-transferring surface so that the gases leaving the absorption chamber through the outlet 28 will have substantially the temperature of the air entering the combustion leg of the U-tube. To assist in transferring the heat between the combustion gases and water, a baffle 44 is placed within the combustion leg of the U-tube and a baffle 46 is positioned in the gas-outlet leg of the U-tube. The baffles 44 and 46 have a circular cross-section and are mounted concentric to and spaced from the inner surface of the tube 34 to form the gases into a comparatively thin sheet as they are forced along the walls of the tube. With this construction, the gases are confined to a comparatively small area so that they have a higher speed through the tube and thus effect a more efficient heat transfer. To force the gas to flow between the baffles and the tube 34 a deflector 48 is placed over the lower end of the baffle 44 and a deflector 50 is placed over the upper end of the baffle 46. These deflectors and the baffles serve to agitate the combustion gases to form eddy currents and cross currents to thereby cause an active circulation of the gases within the tube in conjunction with their passage through the tube. The secondary currents serve to bring different portions of the gas into contact with the surface of the tube to assist the heat transfer. As the heat is taken away from the gases, they contract in volume and the area of the space between the baffles 44 and 46 and the tube 34 is decreased in the direction of flow of the gases so that the velocity of the gases through the tube is substantially uniform. The baffles 44 and 46 are held in position in the tube 34 by means of spacing clamps 52 which serve to hold the baffles in spaced relation to the tube. The spacers 52 entirely span the gap between the baffles and the tube so that the spacers will not become highly heated to flash water of condensation immediately into steam and thus interfere with the readings of the various thermometers.

A thermometer 54 (Figs. 1 and 2) is placed in the outlet 28 to indicate the temperature of the outcoming products of combustion and by varying the course and velocity of the combustion gases through the tube 34, the temperature of the gases at the thermometer 54 may be accurately controlled. To regulate the velocity of the gases through the tube 34, a shutter 56 (Fig. 2) is slidably mounted in the end of the outlet tube 28 and has a series of openings 58 which are movable under openings 60 formed in the end of the tube 28. By adjustment of the shutter, the outlet of the gases may be throttled to build up more or less back pressure of the gases passing through the heat-absorption tube 34. The course of the combustion gases through the tube 34 may be varied by means of a shutter 62 mounted over the baffle shield 48 and a shutter 64 mounted over the baffle shield 50 (Fig. 5). The shutters 62 and 64 have triangular openings 66 and 68 which are arranged to register respectively with openings 70 and 72 in the shields 48. The shutter 62 may be manually adjusted through the opening at the bottom of the combustion leg of the heat-absorption chamber and the shutter 64 is arranged to be adjusted by means of a rod 74 which is attached to the shutter and extends through the bottom of the outlet leg of the combustion chamber. The lower end of the rod 74 passes through a clamp 76 attached to the frame 40 by which the rod may be held in any desired position. To vary the position of contact of the annular sheet of combustion gases with the surface of the tube 34 and thus assist in obtaining a perfect heat transfer between the combustion gases and the water, the baffles 44 and 46 are arranged to be adjustable longitudinally of the tube. The baffle 46 may be adjusted longitudinally by means of the rod 74. The baffle 44 is formed in two sections which are telescopically mounted in one another. By this means the length of the sheet of gas surrounding the baffle 44 may be changed. To adjust the baffle 44 longitudinally of the tube 34, a rod 78 is connected to the lower end of the baffle and extends downwardly through the bottom of the combustion leg of the absorption chamber. The baffles 44 and 46 and shields 48 and 50 are preferably made of mica so that these parts will have a low thermal capacity and thus prevent lag in the readings of the inlet and outlet thermometers.

To prevent heat losses due to radiation from the flame of the gas burner 26 outwardly through the bottom of the combustion leg of the heat-absorption chamber, a baffle 80 is mounted upon the burner 26 and a baffle 82 is suspended from the bottom of the absorption chamber in position to surround the burner 26. The baffles 80 and 82 are preferably made of mica which may be coated with a carbon paint to absorb the heat of radiation, and this heat will be carried up into the combustion leg of the absorption chamber by the air entering for the combustion of the gas.

The water used in making heat determinations usually has air entrained therein and it is desirable that the entrained air shall not be carried by the water into the gas-displacing tank 22 because this air will dilute the gas and cause an error in the gas volume. To prevent air from being carried into the tank 22, an outlet 84 (Figs. 2 and 3), is attached to the water jacket 36 at the upper end of the absorption chamber and a glass tube 86 is mounted in the outlet 84 and extends upwardly to a height equal to the height of the water pressure regulator 10. Any air which enters the water jacket will find its way to the outlet and exhaust to the atmosphere through the open tube 86.

The gas-displacing and measuring tank 22 shown in the drawings preferably consists of a glass bottle having a top outlet 88 and a bottom outlet 90. The top outlet is arranged to receive a rubber stopper 92 which has openings for a thermometer 94, an inlet pipe 96 for connection with the water tube 20, an inlet pipe 98 for connection with a tube 100 for the reception of incoming gas, an outlet pipe 102 for connection with a pressure gage 104 mounted on the frame 40, and an outlet pipe 106 for connection with the gas tube 24. In the outlet 90 is mounted a stopper 108 in which is mounted an outlet pipe 110 connecting with a water-drain tube 112. The tubes 24, 100 and 112 are preferably made of rubber and the flow of gas and water through these tubes is controlled by means of pinch cocks 114 mounted on the base of the frame 40.

The rubber tubes connected between the absorption chamber and the gas-displacing tank may have any desired length to permit the tank 22 to be supported in any desired position to vary the pressure of the gas flowing through the absorption chamber. By the use of the rubber tube connections, the tank 22 may be easily disconnected from the heat-absorption chamber to permit it to be cleaned. Further, by having the tank 22 independent of the absorption chamber, it may be taken to the place where the sample is to be taken and thereafter connected with the absorption chamber to make the heat determination. This is very desirable because it is not always possible to have a gas calorimeter at the point where the gas sample is taken, and further it is best to have a calorimeter in a laboratory where it can be operated under substantially uniform conditions to minimize the errors due to changes in temperature of the room and changes in temperature of the water used in the absorption chamber.

Small bubbles of air may be entrained in the water as it leaves the absorption chamber and to prevent this air from passing into the tank 22, a gas-trapping bulb 116 is mounted at the top of the inlet pipe 96. The absorption chamber water-outlet tube 20 is connected with the bulb 116 and when the water enters the bulb, the rate of flow is decreased sufficiently to allow the entrained air to rise to the top of the bulb. The air collecting in the bulb 116 is permitted to continuously escape through a valve outlet tube 117. The flow of water through the bulb 116 and into the displacement tank 22 is controlled by a valve 118 in the pipe 96.

To maintain a uniform pressure in the tank 22 when displacing the gas with water, the inlet pipe 96 terminates immediately after passing through the stopper 92 and a water-distributing tube 119 having larger diameter than the pipe 96 leads from the end of the pipe to the bottom of the tank. The tube 119 serves to lead the water quietly into the bottom of the bottle while at the same time preventing water from being siphoned into the tank. Since the tube 119 is within the tank 22, the water will stand in the tube at the same height as in the tank 22 and as the water rises in the tank, it will drive gas out of the tube into the tank and the pressure in the tank will remain uniform.

The calorific value of a gas as obtained by multiplying the temperature difference of the thermometer readings 30 and 32 by the coefficient of thermal capacity of a unit volume of water, gives what is commonly called the gross heat value of the gas. When the gas is being burned in the Bunsen burner 26, however, hydrogen of the gas unites with oxygen of the air to form water, and this water will condense on the walls of the tube 34. When this water is condensing on the walls of the tube 34, it gives up its latent heat and some sensible heat to the walls to add heat to the water in the jacket 36, and this latent heat and sensible heat of the water should be subtracted from the calorific value of the gas as determined above to give the net calorific value of a gas. The condensed water will accumulate into large drops and eventually work its way to the bottom of the legs of the absorption chamber where it is caught by a trough 120 at the bottom of the combustion leg and by a trough 121 at the bottom of the gas-outlet leg. The water caught in the troughs 120 and 121 passes through drains 122 (Fig. 1) and is collected in a graduate 124 to be measured. The amount of gas necessary for making a heat determination in the calorimeter, however, is not sufficient to give a reliable quantitative analysis of the water condensed from burning the gas, and to accomplish this the tank 22 has a set of graduations 126 by which the volume of gas being burned may be measured so that the apparatus may be used for making a quantitative analysis of water condensation. To carry out this operation a record is made of the time necessary for burning a predetermined volume of gas as measured by the graduations 126, and the pressure of the gas being burned is recorded on the manometer 104. Then the gas tube 100 is opened to admit the same kind of gas from an outside source into the tank 22 and the water-drain pipe 112 is opened to permit water to continuously run out of the tank 22 at about the same rate as it flows in from the absorption chamber. The gas is permitted to enter the tank 22 through the tube 100 at such a rate that the manometer reading will be the same as the manometer reading during the volume determination of the gas as measured by the tank graduations 126. It is apparent, that when the manometer reading is the same when the gas enters through the tube 100 as when the gas was being displaced with water in the tank 22, that the gas is passing through the tank 22 at the same rate at which it was being displaced by the water. Therefore, at the end of a predetermined time, for example one hour, a known volume of gas will have passed through the tank 22 from the tube 100 and the graduate 124 may be removed at the end of the predetermined time to determine the amount of water condensed from a predetermined amount of gas. From this determination the gross calorific value of a gas can be corrected to give the net calorific value of the gas.

While under normal laboratory conditions it is preferable to circulate water through the absorption chamber countercurrent to the direction of flow of the combustion gas, this operation is not always necessary. For instance, when the water to be used in the absorption chamber is quite cold, it is desirable to enter the water through the combustion leg of the absorption chamber and to lead out the water through the gas outlet leg of the absorption chamber. In this way the water and combustion gas will flow in parallel paths and the hottest gas will contact with the coldest water through the wall of the combustion chamber.

The preferred form of the invention having been thus described, what is claimed as new is:

1. A gas calorimeter having in combination, a heat-absorption chamber, means for burning gas in said chamber, means for conducting water through said chamber, a tank detachable and independently movable with relation to said chamber, means for conducting gas from said tank to said gas-burning means, means for displacing gas in said tank volume for volume with water passing through said chamber, and means for measuring the rise in temperature of said water in passing through said absorption chamber.

2. A gas calorimeter having in combination, a heat-absorption chamber, means for burning gas in said chamber, means for conducting water through said chamber, a transparent graduated tank independently movable with relation to said chamber, means for conducting gas from said tank to said burning means, means for displacing gas in the tank by water passing through said chamber as the gas is being burned, and means for collecting water condensed from combustion gases in said absorption chamber.

3. A gas calorimeter having in combination, a heat-absorption chamber, means for burning gas in said chamber, a water jacket for said chamber, a tank independently movable with relation to said chamber, a flexible tube for conducting gas from said tank to said burning means, a flexible tube for conducting water from said absorption chamber to said tank, means for displacing gas in the tank with water passing through said jacket as the gas is being burned, and means for measuring the temperature of the water as it leaves and enters the absorption chamber.

4. A gas calorimeter having in combination, a heat-absorption chamber, means for burning gas in said chamber, a water jacket for said chamber, a tank, means for conducting gas from said tank to said gas-burning means, means for conducting water from said jacket to said tank, means for measuring the temperatures of the water entering and leaving said jacket, and means for continuously leading off from said water jacket air entrained in the water passing therethrough.

5. A gas calorimeter having in combination, an absorption chamber, a tank, a burner for burning gas in said chamber, means for conducting gas from said tank to said burner, means for passing water through said chamber, means for measuring the rise in temperature of water in passing through said chamber, a conduit leading from said chamber into said tank, and a siphon break in said conduit within said tank.

6. A gas calorimeter having in combination, an absorption chamber, a tank, a burner for burning gas in said chamber, means for conducting gas from said tank to said burner, means for passing water through said chamber, means for measuring the rise in temperature of water passing through said chamber, a conduit leading from said chamber into said tank, a siphon break in said conduit within said tank, and means for conducting water from said siphon break to the bottom of said tank without agitating the water therein.

7. In a gas calorimeter, the combination of a tank, a burner, means for conducting gas from said tank to said burner, means for displacing gas in said tank volume for volume with water, and an absorption chamber for heating said water comprising a hollow tube surrounded by a water jacket, said tube being shaped to have its ends positioned on approximately the same level, a water inlet connection with said jacket at one end of said tube, and a water outlet connection with said jacket on the other end of said tube.

8. In a gas calorimeter, the combination of a tank, a burner, means for conducting gas from said tank to said burner, means for displacing gas in said tank volume for volume with water, and an absorption chamber for heating said water comprising a hollow tube having an inverted U-shape, a water jacket surrounding said tube, and a water inlet and a water outlet connection for said jacket mounted at the bottom of said tube.

9. In a gas calorimeter, the combination of a tank, a burner, means for conducting gas from said tank to said burner, means for displacing gas in said tank volume for volume with water, an absorption chamber for heating said water comprising a hollow tube surrounded by a water jacket, a baffle in said tube arranged to form an annular space adjacent said water jacket for the passage of combustion gas, and a water inlet and outlet connected to said water jacket respectively at the opposite ends of said tube and means for measuring the rise in temperature of water passing through said absorption chamber.

10. In a gas calorimeter, the combination of a tank, a burner, means for conducting gas from said tank to said burner, means for displacing gas in said tank volume for volume with water, means for measuring the temperature of said water, and an absorption chamber for heating said water comprising a hollow tube surrounded by a water jacket, and a baffle in said tube arranged to confine the combustion gases to a movement in a thin peripheral layer in contact with the inner surface of said tube.

11. In a gas calorimeter, the combination of a tank, a burner, means for conducting gas from said tank to said burner, means for displacing gas in said tank volume for volume with water, means for measuring the volume of said water, and an absorption chamber for heating said water comprising a hollow tube surrounded by a water jacket, a baffle comprising a hollow shell positioned in said tube and spaced from the inner face of the tube wall, a shield over the end of said shell, and a regulator for controlling the amount of combustion gases passing inside and outside of said shell.

12. In a gas calorimeter, the combination of a tank, a burner, means for conducting gas from said tank to said burner, means for displacing gas in said tank volume for volume with water, and an absorption chamber for heating said water comprising a hollow tube surrounded by a water jacket, a baffle comprising a hollow shell positioned in said tube and spaced from the inner surface of the tube wall, and a shield over the lower end of said shell in the direct path of the burner gases arranged to deflect the gas to the outside of said shield and means for measuring the rise in temperature of water passing through said absorption chamber.

13. In a gas calorimeter, the combination of a tank, a burner, means for conducting gas from said tank to said burner, means for displacing gas in said tank volume for volume with water, an absorption chamber for heating said water comprising a hollow tube surrounded by a water jacket, and a baffle in said tube arranged to form an annular space adjacent to said water jacket for the passage of combustion gases through said tube, the cross-sectional area of said space decreasing in the direction of flow of said gases and means for measuring the rise in temperature of water passing through said absorption chamber.

14. In a gas calorimeter, the combination of a tank, a burner, means for conducting gas from said tank to said burner, means for displacing gas in said tank volume for volume with water, an absorption chamber for heating said water comprising a hollow tube surrounded by a water jacket, baffles mounted within said tube arranged to deflect combustion gas into contact with said tube and means to adjust said baffles longitudinally of the tube and means for measuring the rise in temperature of water passing through said absorption chamber.

15. In a gas calorimeter, the combination of a tank, a burner, means for conducting gas from said tank to said burner, means for displacing gas in said tank volume for volume with water, an absorption chamber for heating said water comprising a hollow tube surrounded by a water jacket and having an inverted U-shape, and separate baffles in each leg of said U-shaped tube arranged to form an annular space adjacent said water jacket for the passage of combustion gases and means for measuring the rise in temperature of water passing through said absorption chamber.

16. In a gas calorimeter, the combination of a tank, a burner, means for conducting gas from said tank to said burner, means for displacing gas in said tank volume for volume with water, an absorption chamber for heating said water comprising a hollow tube surrounded by a water jacket and having an inverted U-shape, a separate baffle in each leg of said U-shaped tube arranged to form an annular space for the passage of combustion gases adjacent said water jacket, and means for adjusting said baffles to vary the course of said combustion gases through said tube and means for measuring the rise in temperature of water passing through said absorption chamber.

17. In a gas calorimeter, the combination of an absorption chamber comprising an inverted U-shaped tube, a water jacket surrounding said tube, a burner arranged to burn gas within said tube, a tank, means for conducting gas from said tank to said burner, and devices mounted at the bottom of both legs of said tube for collecting water condensed from gases of combustion.

18. In a gas calorimeter, the combination of an absorption chamber comprising a hollow tube, a water jacket surrounding said tube, and a non-metallic baffle in said tube arranged to confine the combustion gases to a movement in a thin peripheral layer in contact with the inner surface of said tube.

19. A gas calorimeter having in combination, a heat-absorption chamber, means for burning gas in said chamber, a water jacket for said chamber, a tank, means for conducting gas from said tank to said gas-burning means, means for conducting water from said jacket to said tank, means for measuring the temperatures of the water entering and leaving said jacket, and means in said water circuit to trap and continuously lead off air entrained in the water before the water flows into said tank.

20. A gas calorimeter having in combination, a heat-absorption chamber, means for burning gas in said chamber, a water jacket for said chamber, a tank, means for conducting gas from said tank to said gas-burning means, a water conduit between said jacket and said tank, means for measuring the temperatures of the water entering and leaving said jacket, and means to trap and discharge from said conduit air entrained in the water flowing therethrough.

21. A gas calorimeter having in combination, a heat-absorption chamber, means for burning gas in said chamber, a pressure regulator for forcing water through said chamber and adjustable with relation to said chamber to vary the water pressure in said chamber, means for conducting a predetermined quantity of gas to said burning means, means to determine the volume of water passing through said absorption chamber, and means for measuring the rise in temperature of said water passing through said absorption chamber.

22. A gas calorimeter having in combination, a heat-absorption chamber, means for burning gas in said chamber, means for conducting water through said chamber, a calibrated tank having a non-changeable shape, a pressure gage operatively connected to said tank, means for conducting gas from said tank to said burning means, and means in said absorption chamber for collecting water condensed from combustion gases.

In testimony whereof I affix my signature.
WILBUR G. LAIRD.